June 23, 1959

R. F. LOOMIS 2,891,817

CONVEYING APPARATUS

Filed Aug. 19, 1957

INVENTOR.
ROBERT F. LOOMIS
BY
attys

June 23, 1959 R. F. LOOMIS 2,891,817
CONVEYING APPARATUS
Filed Aug. 19, 1957 6 Sheets-Sheet 2

INVENTOR.
ROBERT F. LOOMIS

June 23, 1959   R. F. LOOMIS   2,891,817
CONVEYING APPARATUS
Filed Aug. 19, 1957   6 Sheets-Sheet 3

INVENTOR.
ROBERT F. LOOMIS

June 23, 1959   R. F. LOOMIS   2,891,817
CONVEYING APPARATUS
Filed Aug. 19, 1957   6 Sheets-Sheet 4

INVENTOR.
ROBERT F. LOOMIS

June 23, 1959  R. F. LOOMIS  2,891,817
CONVEYING APPARATUS
Filed Aug. 19, 1957  6 Sheets-Sheet 5
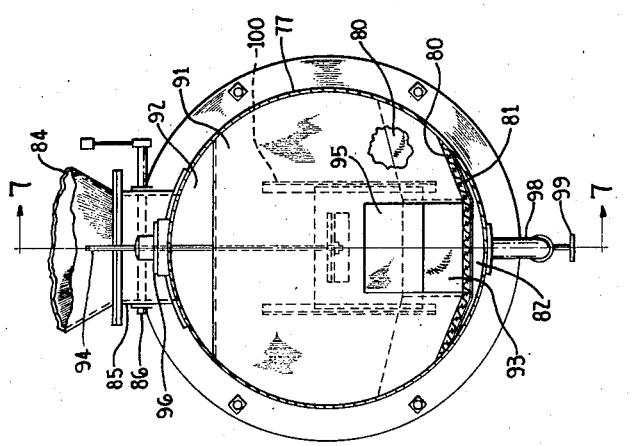
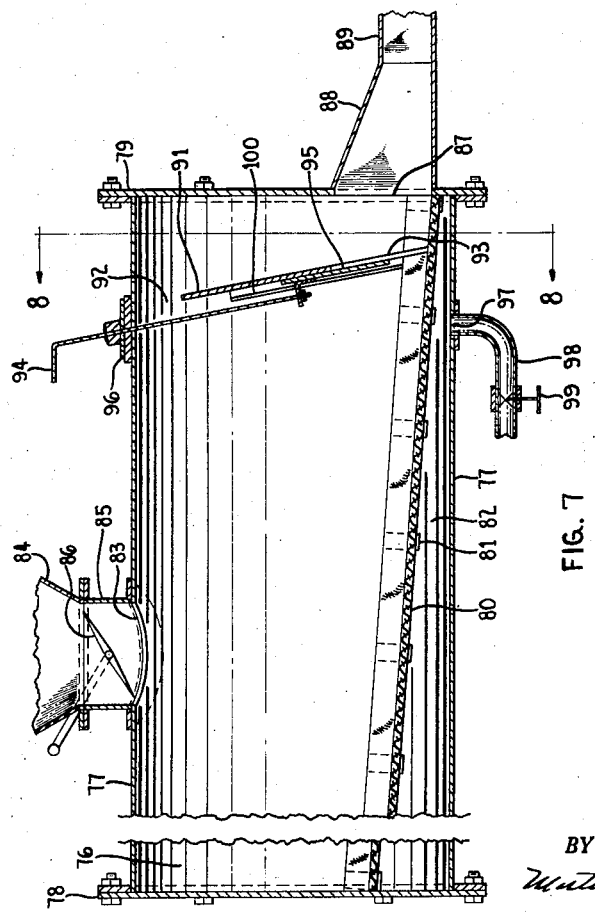
INVENTOR.
ROBERT F. LOOMIS June 23, 1959  R. F. LOOMIS  2,891,817
CONVEYING APPARATUS Filed Aug. 19, 1957   6 Sheets-Sheet 6

INVENTOR.
ROBERT F. LOOMIS
BY Pennie Edmonds
Morton Barrows & Taylor
Attys

United States Patent Office 2,891,817
Patented June 23, 1959

2,891,817
CONVEYING APPARATUS

Robert F. Loomis, Allentown, Pa., assignor to Fuller Company, Catasauqua, Pa., a corporation of Delaware Application August 19, 1957, Serial No. 678,798

31 Claims. (Cl. 302—52)

The present invention relates to the conveying of pulverized or granular material and is more particularly concerned with the conveying of such materials in an air stream by means of a pressurized vessel.

Heretofore, the pneumatic conveying of pulverulent material or granular solid materials from pressurized vessels has required complex piping, valving and instrumentation, or abrasion-prone material-metering devices controlling the delivery of material to or from the vessel. Furthermore, the extreme internal pressures generally involved have required such vessels to be fabricated, inspected and tested according to established codes governing unfired pressure vessels, thereby increasing the cost of the units.

The present invention provides a pressurized pneumatic conveying system which permits operation at pressures below the minimum code pressure. This is accomplished partly by the elimination of periodical, excessive breakthrough or initial pressures required to overcome material friction and the resistance to flow, which is especially characteristic of relatively high pressure blow-tank systems, by the provision of a fluidized feeding means whose feeding rate is substantially unaffected by variations in the vessel's internal pressure, and by an air-material separating and remixing means requires no air flow control, aspiration, or substantial pressure differential for its operability. The air-material separating and remixing means assures a proper mixture, or air-material ratio, and dampens tendencies of the material to wild feeding and surges or other occurrences likely to overload the conveying line with an excess of material to the point of plugging, or to cause excessive pressures therein.

In general, the preferred form of the apparatus comprises a closed vessel having a gas-permeable deck along its floor, which deck overlies a plenum chamber. Gas introduced into the plenum chamber passes upwardly through the gas-permeable deck and fluidizes the pulverulent or granular material thereon. The deck receives material from a container through a valved inlet in the upper part of the vessel and discharges such material, after its fluidization, to a conveying line through an outlet in an end wall in the region thereof immediately above the gas-permeable deck.

A baffle is arranged across the vessel between the inlet and the outlet, and extends between the walls from adjacent the porous deck to a point near the top wall of the vessel, preventing the passage of material from the inlet directly to the outlet, but allowing the free passage of air over the baffle and along the top wall. The baffle is provided with an aperture immediately adjacent the gas-permeable deck and substantially in line with the outlet.

Material introduced on the porous deck is fluidized and flows through the aperture toward the outlet, and is more thoroughly aerated and ultimately entrained, adjacent the outlet, by air escaping from the upper surface of the fluidized material behind the baffle, which air passes over the baffle to join the material entering the outlet. The control by the aperture of the material delivery from the vessel independently of the delivery of the gas from the vessel provides for the establishment of at least a minimum operable ratio of air-to-material, thereby preventing an overload and consequent plugging of the conveying line.

A cycling control mechanism may be included to operate the inlet valve and a valve in the air supply system, so that the compressed air is supplied to the plenum chamber during the period in which the inlet valve is closed for unloading of the vessel, and is shut off or diverted from the plenum chamber during the period in which the inlet valve is open, for the filling of the vessel.

A better understanding of the invention may be derived from the following description and drawings in which:

Fig. 7 is a sectional view of a modified form of the invention;

Fig. 8 is a transverse sectional view taken along lines 8—8 of Fig. 6;

Figure 1:
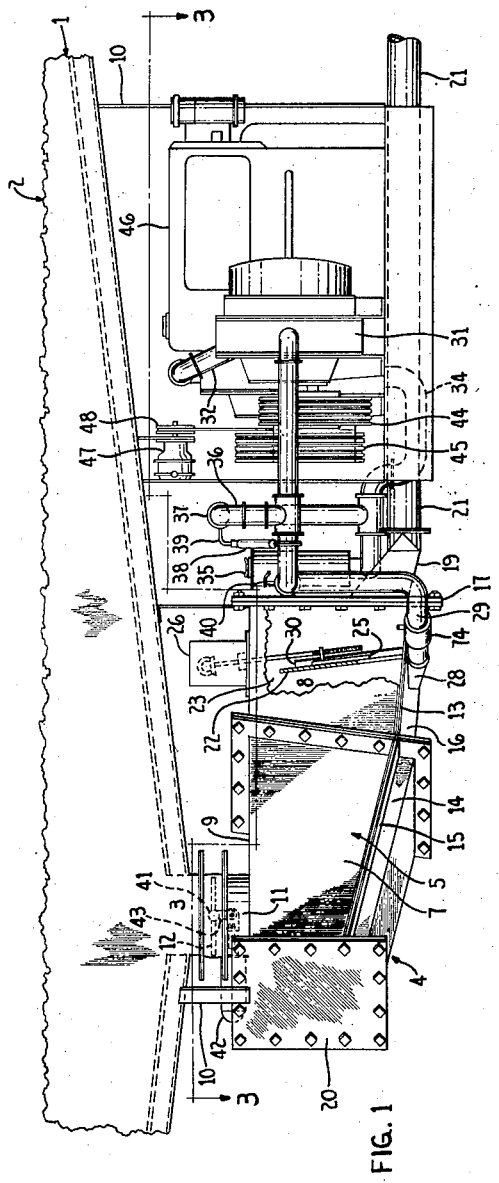
Fig. 1 is a partial side elevation, partly cut away, of a vessel embodying the invention and associated accessories for the transport of the material.
Figure 4:
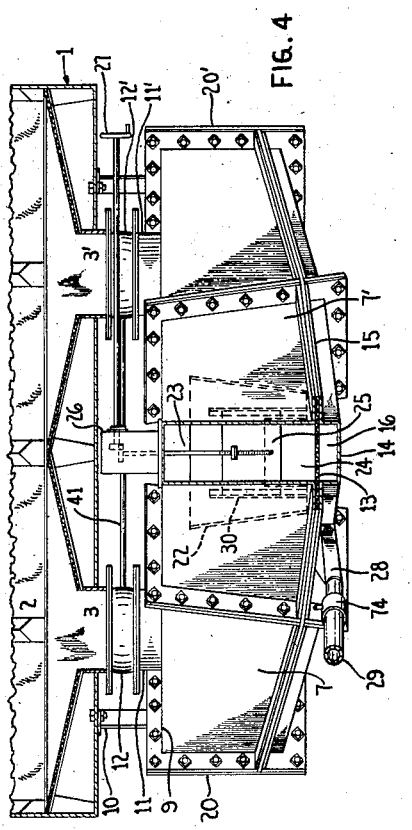
Fig. 4 is a sectional view taken along lines 4—4 of Fig. 3.

As shown in Figs. 1 through 4, a vehicle, 1, preferably of the type disclosed in U.S. Patent 2,589,968 to Schemm, comprising a container or bin 2 having a pair of transversely spaced discharge outlets 3, 3', is fitted with a vessel 4 for receiving and aerating material from said outlets.

The vessel 4 is comprised of a casing 5 supported from the vehicle by supports 10 and having converging side walls 6, 6' and 7, 7' forming a V-shaped chamber 8, and a top wall 9 provided with a pair of material inlets 11, 11'. Material inlets 11, 11' are arranged opposite the discharge outlets 3, 3' of the vehicle bin, and communicate therewith by means of a pair of butterfly valves 12, 12'. In the lower region of the vessel 4, a gas-permeable deck 13 is provided as a floor to the V-shaped chamber. Immediately beneath the gas-permeable deck, a bottom channel 14 is secured to the casing by means of a flange 15, thereby forming a plenum chamber 16 beneath substantially the entire area of the gas-permeable deck.

At the apex of the V-shaped chamber, an end wall 17 is provided between side walls 7 and 7' and is provided with an outlet 18. End wall 17 carries an outlet member 19, communicating with the outlet 18, at its inner end, and with a conveying line 21, at its outer end. A pair of end walls 20 and 20' close the casing 5 at its ends remote from end wall 17 and extend between walls 6 and 7 and 6' and 7', respectively. Adjacent the end wall 17, and spaced therefrom, an interior barrier or baffle wall 22, which forms a partition extends between side walls 7 and 7', and extends from gas-permeable deck 13 upward towards top wall 9, terminating short of said top wall to form an opening 23 therebetween providing a passageway communicating with the space or compartment between the baffle wall 22 and end wall 17. The baffle wall 22 is provided with an adjustable aperture 24 immediately adjacent the gas-permeable deck 13 and generally opposite the outlet 18. The baffle 22 is provided with a slide 25, moving in a pair of guides 30, which in turn is provided with an adjusting mechanism 26 secured to the top wall 9, and is operated by a laterally-extending adjusting wheel 27.

The bottom channel member 14 has an air inlet 28 therein which communicates with an air supply pipe 29 arranged to deliver compressed air from a blower 31, which in turn receives compressed air through a conduit 32 from a blower 33 having an inlet pipe 34 receiving air from an air filter 35. Extending between the air supply piping 29 and the inlet piping 34, a branch pipe, which may be an air recirculating pipe 36 for the recirculation of air back to the blowers 31 and 33, is provided with a butterfly valve 37 operated by a remote actuator or cylinder 38, which regulates the butterfly valve 37 by means of an arm 39. A pressure relief valve 40 is provided in air supply piping 29.

Material inlet valves 12 and 12' are provided with a common operating shaft 41, which is regulated by a remote actuator or cylinder 42 through an integral arm 43 on the shaft 41.

Blowers 31 and 33 are driven by means of power trains 44 and 45, respectively, from a prime mover 46. Blower 33 drives a hydraulic pump 47 through a power train 48 from a pulley 49 on the blower shaft 51.

Figure 5:
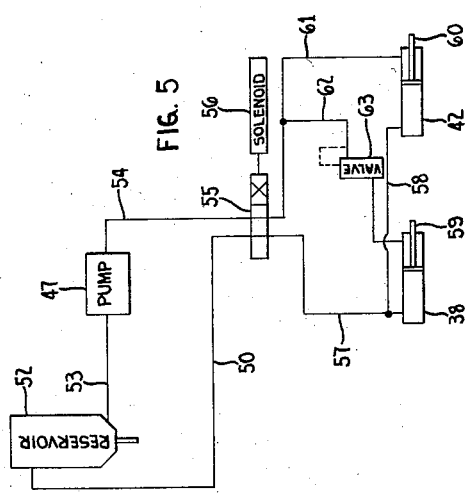
Fig. 5 is a schematic diagram of a hydraulic system for operating the vessel of Fig. 1.

As shown in Fig. 5, the hydraulic pump 47 is supplied with oil from a reservoir 52 through a conduit 53, and discharges by means of piping 54 to a spring-loaded multi-way valve 55. The multi-way valve 55 is provided with a solenoid 56 which, when energized, opens the valve to enable fluid to be delivered through piping 57 and branch piping 58 to the left-hand chambers of cylinders 38 and 42, respectively, thereby causing the extension of their respective pistons 59 and 60. When solenoid 56 is de-energized, valve 55 returns to its normal position and enables oil to be delivered through piping 61 to the right-hand end of cylinder 42, and through branch piping 62 and sequence valve 63 to the right-hand end of cylinder 38, causing retraction of the respective pistons 59 and 60. Hydraulic fluid displaced from each cylinder is vented through the multi-way valve 55 and a return line 50 to the reservoir 52.

Figure 2:
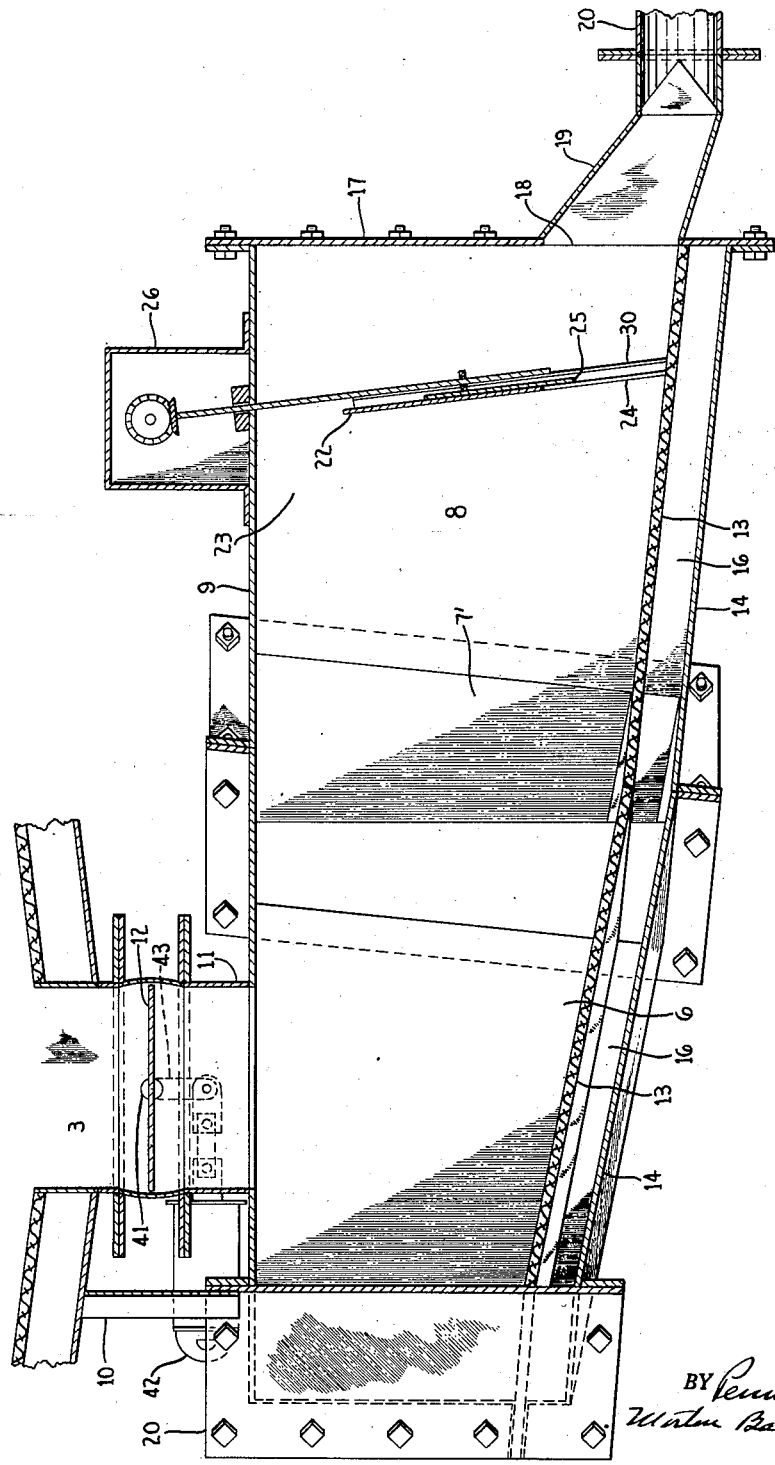
Fig. 2 is a sectional view taken along lines 2—2 of Fig. 3.
Figure 3:
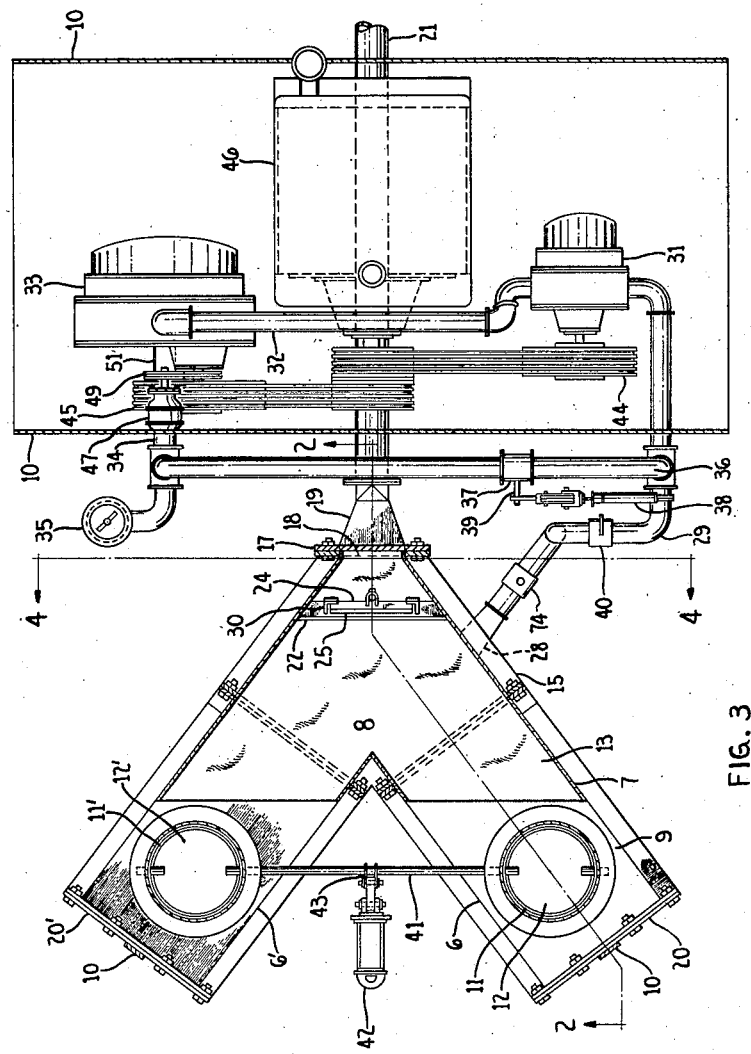
Fig. 3 is a sectional view taken along lines 3—3 of Fig. 1.
Figure 6:
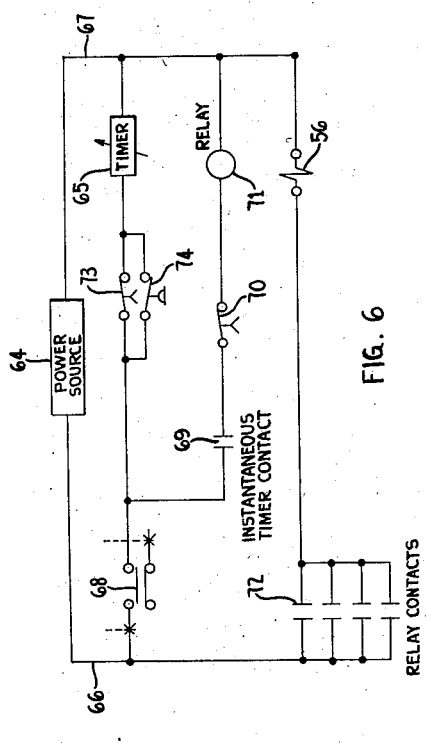
Fig. 6 is a schematic diagram of an electrical control system for the vessel of Fig. 1.

As shown in Fig. 6, an electrical power source 64, which may be the electrical circuit of the vehicle's motive power, serves a timer 65 through lines 66 and 67. A switch 68 is arranged in line 66 to close the circuit to the timer, thereby closing the circuit through an instantaneous timer contact 69 and an adjustable-delay timer contact 70 to energize a relay 71 for a predetermined interval. The contacts 72 of relay 71 are thereby closed and energize the solenoid 56 of multi-way valve 55 for the above-mentioned interval. An adjustable-delay timer contact 73 is also energized upon actuation of the timer, and is adapted to lock in the timer 65, for a preset interval exceeding the interval of timer contact 70, as will be more fully described with respect to the operation. A pressure switch 74 is arranged in air supply piping 29, as shown in Figs. 1 through 3, and schematically in Fig. 5, and is connected in parallel with timer contact 73.

In the operation of the embodiment shown in Figs. 1 through 6, the conveying line is secured to the point to which delivery is to be made, either directly or by means of a receiving conveying line, and preferably by means of flexible piping. The prime mover 46 is started to initiate delivery of air by the blowers 31 and 33, with the air being delivered to the air supply piping 29 leading to the plenum chamber 16. If the vehicle is of the type described in the aforementioned patent to Schemm, the material therein is fluidized according to the procedure disclosed therein.

The adjustable aperture 24 in baffle wall 22 is opened to a predetermined extent. The manual switch 68 is thrown to complete the circuit to the timer 65, actuating timer 65 and closing timer contacts 69, 70 and 73. Timer contacts 69 and 70 energize the relay 71, closing relay contacts 72 and energizing solenoid 56. The energized solenoid 56 throws the multi-way valve 55 to deliver hydraulic fluid from pump 47 and piping 54 to the piping 57 and branch pipe 58, thereby displacing the pistons 59 and 60 to open the air recirculation valve 37 and the material inlet valves 12 and 12' to cause, respectively, recirculation of the conveying air and delivery of material into the vessel.

Upon expiration of the preset interval of timer contact 70, which may be in the order of ten seconds and may be adjusted to regulate the extent of filling of the vessel, the timer contact 70 opens, de-energizing the relay 71 and the solenoid 56. When solenoid 56 is de-energized, multi-way valve 55 reverses to its normal position and delivers hydraulic fluid to the piping 61 and branch pipe 62. The piping 61 immediately conducts the fluid to the cylinder 42, displacing the piston 60 to close the material inlet valves 12 and 12'. However, the sequence valve 63 delays the fluid in branch piping 62 until the piston 60 has bottomed in cylinder 42, and completed the closing of material inlet valves 12 and 12'. When the piston 60 has bottomed, the fluid pressure in piping 61 and 62 is increased by the stoppage of piston 60, and overcomes the resistance of sequence valve 63, delivering fluid therethrough to cylinder 38 and displacing piston 59 to close the air recirculation valve 37 after closure of the material inlet valves 12 and 12'.

The closure of the air recirculation valve 37 causes delivery of the compressed air from blower 31 to the plenum chamber 16 through air supply piping 29. As the pressure in the air supply piping 29 is thus raised and reaches the upper limit of the pressure switch 74, which may be, as an example, fourteen pounds, the pressure switch 74 closes to lock in the timer 65. A maximum pressure of fifteen pounds, as an example, may be limited by the pressure relief valve 40. The time delay of timer contact 73 is preferably adjusted to a greater preset interval than that of the timer contact 70, and, as an example, may be in the order of five seconds greater duration than is required for the opening and closing of material inlet valves 12 and 12'. This delay by timer contact 73 holds the timer from resetting and recycling until the pressure switch 74 closes after the successive delays caused by the sequence valve 63 and the compression of air within the plenum chamber 16 and its associated system.

Material which is deposited within the vessel through material inlets 12 and 12' during the time in which those valves are open is then fluidized by air permeating through the gas-permeable deck from the plenum chamber. As the material is fluidized, hydraulic properties imparted thereto cause the material to form a fluidized bed, and a portion thereof to flow through aperture 24 and along the surface of the deck in a relatively thin layer to the outlet 18, while the main portion of the material is held back by the baffle 22. Simultaneously, and through displacement thereof by the air diffused through the bed of material, air is separated from the material bed at the upper surface thereof, passes over the upper edge of the baffle wall 22 and down through the space or compartment between the baffle and the end wall 17, into the outlet 18 and the outlet member 19.

The air passing downwardly through the compartment between the baffle and the end wall impinges on the thin layer of material delivered through the outlet, further aerates the material to a greater extent than existed in the fluidized bed, and effects the displacement of the material through the outlet 18 and the outlet member 19 to the conveying line 21 through which the entrained solid particles are conveyed to the ultimate discharge. The control of the rate of material discharge from the vessel, independently of the rate of discharge of the air therewith, permits an optimum air-material ratio, or conveying stream density, to be established and utilized for a given material, as well as providing for the prevention or dampening of surges of insufficiently aerated material into the conveying line and a consequent plugging of the line.

When the vessel has been completely discharged, the pressure in the vessel 4 and the air supply piping 29 will decrease, because of the relatively unobstructed path for air flow through the gas-permeable deck 13, vessel 4, and conveying line 21 to a vented area, until the lower limit of the pressure switch 74 is reached, for example five pounds, and the pressure switch 74 is opened. The opening of the pressure switch de-energizes the timer, thereby resetting the timer to cause the timer contact 73 to close, re-energizing the timer and again energizing the relay 71 and the solenoid 56, causing the multi-way valve 55 to open the material inlet valves 12 and 12' and the air recirculation valve 37, as described, and starting a repeating cycle.

When the system is to be shut down, the switch 68 is opened, preventing the energizing of solenoid 56, and thereby allowing the multi-way valve 55 to deliver fluid from the blower-driven hydraulic pump 47 to the piping systems 61 and 62 and closing the material inlet valves 12 and 12' and the air recirculation valve 37. The compressed air delivered through air supply piping 29 clears the vessel 4 and conveying line 21 of residual material, and the closure of the material inlet valves prepares the vehicle for subsequent loading. The closed position of the valves will be held, after the hydraulic pump is shut off, by the resistance of the pump to a reverse flow of fluid, and may be insured by the provision of a nonreturn valve in the line 54.

As shown in Figs. 7 and 8, a cylindrical vessel 76 is formed by a cylindrical wall 77 and end walls 78 and 79. A gas-permeable deck 80 is secured on a plurality of supports 81 along the lower segment of the wall 77 and is spaced therefrom to form a plenum chamber 82. The upper segment of the wall 77 is provided with an inlet aperture 83 which communicates with a bin 84, or other source of material, through a conduit 85 having a valve 86 therein.

The end wall 79 is provided with an outlet opening 87 and an outlet member 88 communicates therewith at its near end, and communicates with a conveying line 89 at its outer end.

A barrier or baffle wall 91 forms a partition and is arranged across the vessel transversely between the material inlet 83 and the outlet 87 and near the end wall 79 to form a compartment therewith, and meets the upper surface of the gas-permeable deck 80 in a sealing relationship. The upper end of the baffle 91 terminates short of the upper segment of the wall 77 to provide a passageway or opening 92 for the free passage of air therebetween. As an alternative, the baffle may be extended to join the upper segment of the wall, and may be provided with one or more openings therein for passage of the air. The baffle wall 91 is provided with an adjustable aperture 93 immediately adjacent the gas-permeable deck 80, and generally opposite the outlet 87. The baffle wall 91 is provided with a slide 95 moving in a pair of guides 100. An adjusting handle 94 extends upwardly from the slide 95 through a sealing and positioning collar 96 in the upper segment of the wall 77. The wall 77 has an air inlet aperture 97 therein in the segment forming plenum chamber 82 which communicates with an air supply pipe 98 which, in turn, communicates through a valve 99 with a source of air under pressure (not shown).

In operation, the adjusting handle 94 is employed to open the aperture 93 and is retained in a set position by the collar 96. The valve 86 is thrown to deliver material into the vessel. When the vessel has been filled, the valve 86 is closed, stopping the material delivery into the vessel, and valve 99 is opened, admitting compressed air through the valve 99, piping 98 and the inlet 97 to the plenum chamber 82.

The air passes from the plenum chamber through the gas-permeable deck 80, fluidizing the material thereon, and is released from the upper surface of the material bed to pass along the upper segment of the wall 77, through the opening 92, and the gas passageway between the baffle wall 91 and end wall 79, to the region of the outlet 87. Simultaneously, the fluidized material discharges through the adjustable aperture 93 as a relatively thin layer which travels along the gas-permeable deck 80 to the outlet, and is there impinged upon, agitated, and more thoroughly aerated by the air passing over baffle 91 and downwardly against the thin material layer, and is discharged therewith through the outlet 87, outlet member 88, and into conveying line 89 for entrainment to the point of delivery. The regulation of the rate of discharge of material from the vessel without a corresponding regulation of the rate of air discharge therewith provides for a positive aeration of the material being delivered through the aperture into a mixed stream of a suitable air-material ratio, which ratio varies between different materials and receiving systems. Since the pneumatic pressures on either side of the baffle and aperture are substantially equal, the fluidized material is fed toward the relatively unrestricted, downward air flow adjacent the outlet through its pseudo-hydrostatic head and its tendency to seek an aerated angle of repose, thereby being subjected to smooth delivery and conveying without sudden changes in its conveying rate.

When the vessel has been completely discharged, the valve 99 is closed and the valve 86 is opened, thereby shutting off the air supply to the plenum chamber, resuming delivery of material to the vessel, and initiating a subsequent cycle.

Figure 9:
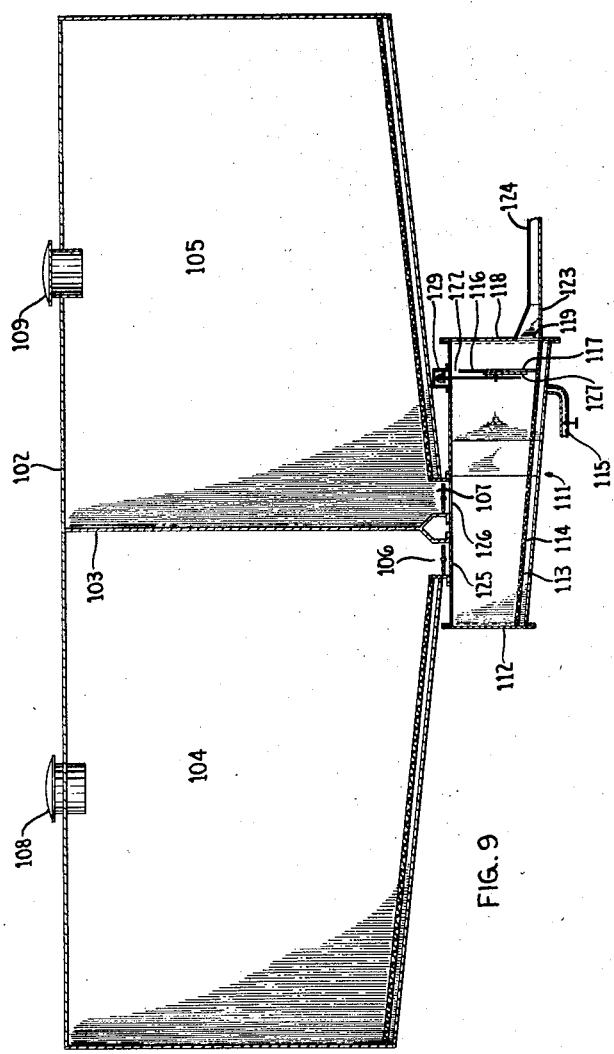
Fig. 9 is a sectional view of a modified form of the invention as applied to a divided bin taken along lines 9—9 of Fig. 10.
Figure 10:
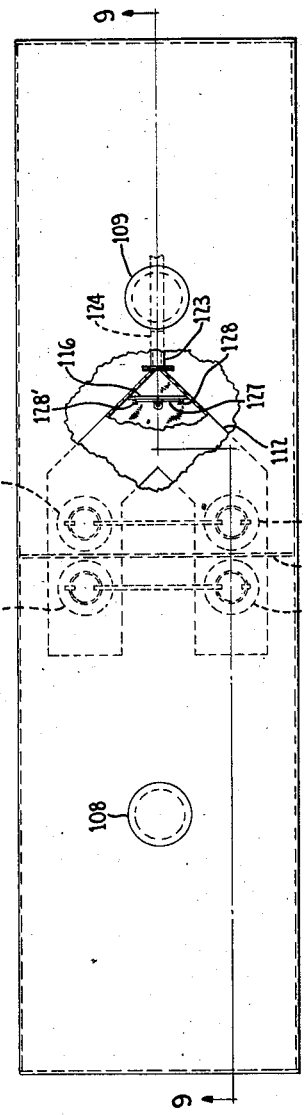
Fig. 10 is a plan view of the bin of Fig. 9, partly cut away, to show the baffle.

As shown in Figs. 9 and 10, a bin 102, which may be vehicle-mounted, is centrally divided by a partition 103 into two chambers 104 and 105. The chambers 104 and 105 are provided with paired outlets and valves 106, 106' and 107, 107', respectively, and with individual inlets 108 and 109, respectively.

A vessel 111 is mounted beneath the outlets of the bin 102 and comprises a casing 112 having a gas-permeable deck 113 across the bottom thereof and a plenum chamber 114 beneath the gas-permeable deck 113 which is served by a valved air inlet 115. An interior barrier or baffle wall 116 having an adjustable aperture 117 extends upwardly from the surface of the gas-permeable deck near an end wall 118, having an outlet 119, to a point below an upper wall 12, defining an opening 122 therewith for the passage of air therebetween and toward an outlet 119 for passage therethrough to an outlet member 123, mounted on end wall 118, and a conveying line 124 communicating with the outlet member 121.

The upper wall 121 of casing 112 is provided with two groups of paired inlets 125, 125' and 126, 126' which are aligned with and connected to the valve outlets 106, 106' and 107, 107', respectively, of the bin 102.

The size of the aperture 117 is adjusted by means of a slide 127 moving in a pair of guides 128, 128', which is displaced along the surface of the baffle wall by an adjusting mechanism 129.

A control circuit and hydraulic system similar to those shown in Figs. 5 and 6 may be applied to the embodiment shown in Figs. 9 and 10. However, when the chambers 104 and 105 of bin 102 contain dissimilar materials, as is made possible by the disclosed arrangement, material may be delivered to the vessel selectively from either of chambers 104 and 105 by only the pair of valved outlets associated with the chosen chamber. In this case, a two-way hydraulic valve may be inserted adjacent the multi-way valve 55 in the hydraulic line corresponding to line 61 of Fig. 5 to divert the fluid to either of a pair of cylinders individually operating the desired pair of valves 106, 106′ or 107, 107′.

In operation of the embodiment shown in Figs. 9 and 10, material is delivered from the desired chamber 104 or 105, or both, into the vessel 111 by means of the appropriate pair or pairs of valves 106, 106′ and 107, 107′ which are then closed when the vessel has been filled. Compressed air from a source (not shown) is introduced to the plenum chamber 114 through the valved air inlet 115, and fluidizes the material above the gas-permeable deck 113, subsequently separating from the upper surface of the material and passing through the opening 122 and downwardly through the space or compartment between the baffle wall 116 and the end wall 118 to impinge upon and mix with material discharged in a relatively thin layer through adjustable aperture 117, and to be discharged therewith through the outlet member 123 to the conveying line 124.

This arrangement is particularly advantageous for services in which it is desired to transport different materials in a vehicle for separate discharge with a minimum of contamination between the materials. The sloping surface of the gas-permeable deck 113, if arranged at an angle from the horizontal which is greater than the aerated angle of repose of the materials, will be sufficiently self-cleaning as to prevent substantial contamination between the two materials, which may be, for instance, two different types of a similar product such as flour.

Figure 11:
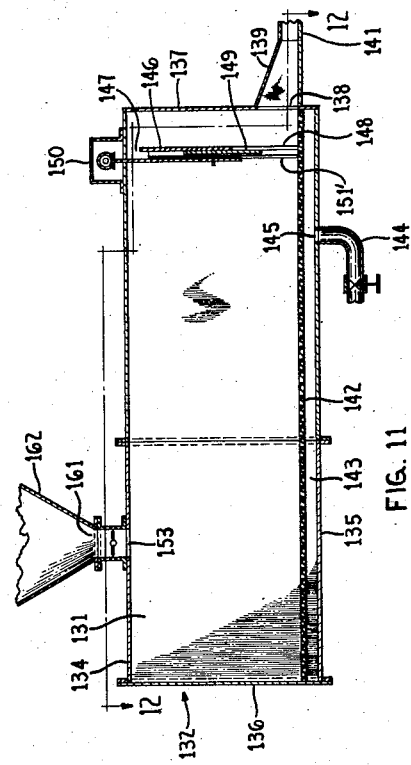
Fig. 11 is a sectional side view of a further modified form of the invention taken along lines 11—11 of Fig. 12.
Figure 12:
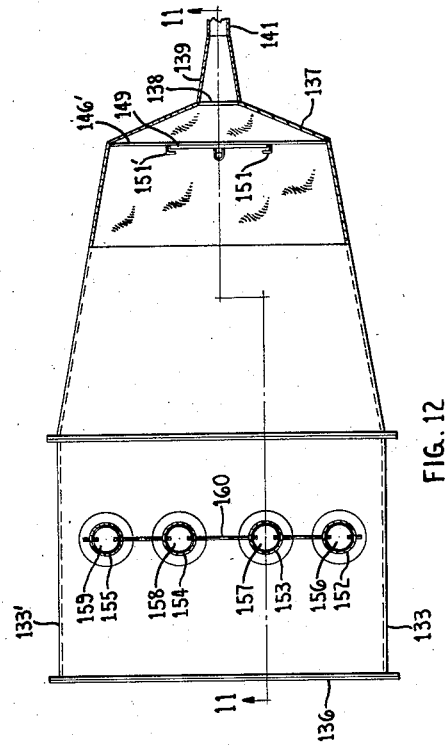
Fig. 12 is a sectional view taken along lines 12—12 of Fig. 11.

As shown in Figs. 11 and 12, a vessel 131 comprises a generally triangular-shaped casing 132 having a pair of side walls 133 and 133′, an upper wall 134, a floor 135, an end wall 136 and an end wall 137 having an outlet 138 therein. End wall 137 supports an outlet member 139 which communicates with the outlet 138 and with a conveying line 141. Within the casing 132, a gas-permeable deck 142 is arranged in a horizontal position and is spaced from the floor 135 to form a plenum chamber 143 therebetween. The plenum chamber 143 receives air under pressure from a source (not shown) by means of a valved inlet pipe 144 which is connected to an air inlet aperture 145 in the floor 135.

An interior barrier or baffle wall 146, which functions as a partition, is arranged across the casing 132 and extends upwardly from the surface of the gas-permeable deck 142 toward the upper wall 134, terminating short of the upper wall to provide an opening 147 therebetween. The baffle wall is provided with an adjustable aperture 148 which is aligned with the outlet 138 in end wall 137, and is partially defined by the upper surface of the gas-permeable deck 142. The size of the aperture is adjusted by means of a slide 149 mounted on baffle wall 146, which is adjusted by a regulating mechanism 150 and moves in guides 151 and 151′.

The upper wall 134 is provided with four inlets 152, 153, 154 and 155 having valves 156, 157, 158 and 159, respectively, which may be operated by a common valve-shaft 160, and which are adapted to receive material from corresponding outlets, as shown by numeral 161 in a container or bin 162.

In operation of the embodiment shown in Figs. 11 and 12, material is delivered into the vessel 131 through the inlets 152, 153, 154 and 155. When the vessel has been filled, the inlet valves 156, 157, 158 and 159 are closed and compressed air is admitted to the plenum chamber 143 through the valved inlet pipe 144 and the air inlet aperture 145. The air passes through the gas-permeable deck 142, fluidizing the material thereabove, and is separated from the upper level of the material bed. The separated air passes along the upper wall 134 through the opening 147, and downwardly through the gas passageway between the baffle wall 146 and the end wall 137 toward the outlet 138. At the same time, the fluidized condition and depth of bed of the material causes it to flow along the gas-permeable deck and through the adjustable aperture 148 to the outlet 138, where it is more thoroughly aerated by the air passed over the baffle wall 146, and is carried out through the outlet 138 and outlet member 139 to the conveying line 141.

Except when handling materials having a very low angle of aerated repose, it is probable that the apparatus of Figs. 11 and 12 will retain a residual quantity of material which will not discharge along the horizontal gas-permeable deck 142. However, this apparatus is particularly advantageous for services wherein conveying capacity is of primary importance, the available space and headroom are drastically limited, and the presence of such residue is not critical.

In certain cases, such as in the handling of flour and other food materials, it may be preferable to provide a fixed orifice in place of the adjustable apertures shown in the several embodiments, and/or to have such apertures extend the full width of the baffle wall. This will minimize or eliminate the possibility of build-ups of residual material on shoulders or corners, which may be subject to a later infestation by cereal insects. In any case, and particularly if the vessel is intended for portable use, sealing of the unit during periods of nonuse may be accomplished by known cap means fitted to the outer end of the outlet member after the conveying line has been disconnected. In such cases, the valves may be spring-loaded, if not otherwise arranged, to remain in a closed position until positive opening is effected.

It is not necessary, in many instances, that the aperture in the baffle wall be adjustable, but in cases in which it is necessary, such as is contemplated when the vessel of this invention is required to serve different installations of different conveying line size or other variables, known methods of interior design may be employed to prevent residue build-ups in corners and on ledges. In this way, a vehicle may deliver a part of its lading to an installation having a given conveying line size, using the full opening of the adjustable aperture. Subsequently, when delivering the remainder of its lading or a portion thereof to a second point of discharge, with a smaller capacity receiving system, the adjustable aperture may be closed to a point of less than full area to modify the rate of material discharge therethrough in accommodation of the lower capacity system.

However, once the adjustable aperture is set for a given installation, it is to remain open, under normal operation, to substantially the same point until discharge to that installation has been completed, without regulation during the filling and discharging cycles. This is made possible by the instantaneous passage of air over the baffle to the outlet upon admission of air into the material. During filling, as the material drops onto the gas-permeable deck from the material inlets, it falls through air and may splash on the deck and be excessively aerated by the splashing and falling action. Therefore, when air is supplied through the gas-permeable deck into the bed of material, a generally similar amount of air is substantially immediately displaced from the upper surface of the bed. Also, as the air passes into the material from the gas-permeable deck, a flow of material will commence almost immediately through the aperture, tending to flow toward the outlet and the outlet member. If this material flow were allowed to continue without being removed from the area of the outlet and conveyed through the outlet member, plugging of the line would result. Such plugging is prevented by the relatively large volume of air simultaneously flowing from above the material and over the baffle wall through the outlet, outlet member and into the conveying line.

The balanced pneumatic pressure on both sides of the baffle wall, as well as the relatively large area of the upper surface of the material bed, from which air is delivered towards the outlet, cooperate to prevent the wild or erratic delivery of material through the aperture, and the plugging of the line. The large area of the upper material surface from which air is released provides sufficient volume of air to entrain and to carry the relatively restricted amount of material delivered through the aperture as a relatively thin layer. The balance of pneumatic pressure across the baffle wall eliminates the wild feeding characteristic of pressurized feeding to a mixing or ejector chamber, and enables the material to feed through the aperture solely under the influence of gravity and the slight hydraulic pressure exerted by the depth of the fluidized material. The flow, therefore, is smooth in nature, providing an optimum mixing of air and material in the outlet and the outlet member into a suitable air-material ratio, and eliminating the pulsating flow or slugging often found in systems using other types of apparatus, such as rotary blowthrough feeders or star feeders which introduce the material to a conveying line in small batches with local regions of highly compressed air being present between the batches.

The independent regulation of the rate of material discharge from the vessel, rather than a regulation of both the air and the material as a mixture, prevents the erratic delivery of pressurized metering and the surges of excessively dense material that occur in pressure-fed vessels employing regulation of the air and material as a mixture, and thereby provides and preserves at least a minimum operable air-material ratio necessary to smooth, nonplugging operation of the system.

The prevention of line plugging is also augmented by the particular tapered outlet members shown in Figs. 7 through 12. In case an excessive amount of material is delivered through the aperture before sufficient pneumatic pressure exists within the vessel to cause an adequate flow of air to the line, a material build-up on the lower floor of the outlet member will inhibit material flow through the aperture until air is delivered over the baffle and through the upper regions of the outlet member. The taper of the upper wall of the outlet member ensures that air passing over the baffle wall will have at least a minimum area through which to flow towards the conveying line, thus initiating the entrainment of the material by gradual erosion. Upon the entrainment of a substantial portion of the built-up material, material flow through the aperture will be resumed.

The prevention of plugging of the outlet and the conveying line is further augmented by the baffle wall. As material is dropped into the vessel, it may, in many cases, exhibit sufficient fluidity to produce violent splashing, tending to splash upwardly and outwardly from the point of impact. The baffle wall deflects such splashes back towards the inlet, and prevents a splashover to the area of the outlet and outlet member, which might otherwise obstruct that area and prevent the passage of initial air therethrough. A sloping baffle wall, as shown in Figs. 1 through 4, 7 and 8, is particularly effective for this purpose.

Also, with materials which are relatively difficult to convey by fluidization, there may be a tendency for the material adjacent the aperture to discharge faster than the more remote material is able to flow through the area, causing temporary steep faces in the material which, if released suddenly, tend to choke the aperture and splash against the baffle wall. As before, the baffle wall directs such splashing back towards the main material body, ensuring the delivery of air to the outlet for conveying the material discharging through the aperture.

In Figs. 1 through 4 and 7 through 10, the gas-permeable deck has been shown arranged at a slope from the horizontal towards the aperture, since this arrangement ensures operation with difficult materials, and is particularly advantageous when a minimum of residue is essential. However, many materials with very low angles of aerated repose may be conveyed efficiently by the vessel of this invention when the porous medium is arranged in the horizontal position as shown in Figs. 11 and 12. This horizontal arrangement of the gas-permeable deck may be of a particular advantage when it is desired to increase the capacity of the vessel when severe space limitations, particularly vertical dimensions, are present.

Both the total conveying gas volume and the rate of flow of fluidizing gas, per unit area of the deck, will be relatively fixed by the receiving system and the material characteristics, respectively, both of which may vary considerably between installations. If the required total volume per minute is supplied to meet the requirements of the conveying line, but is supplied through too small a deck area, the fluidizing velocity of the gas passing through the material will be excessive, and will tend to entrain material directly from the bed. Conversely, if the fluidizing area is too large, the fluidization and flowability of the material will be incomplete and erratic. The sizing of the area of the gas-permeable deck will be chosen according to the physical details of the receiving system, the characteristics of the particular material to be conveyed, and the permeability of the particular deck material employed. However, if desired, a proper balance may be effected through a valved conduit extending from the plenum chamber or air supply pipe directly to the space above the material level or to the passageway between the baffle and its adjacent end wall.

Various changes may be made in the details of construction without departing from the scope of the invention or sacrificing any of the advantages thereof.

I claim:

1. Apparatus for discharging pulverulent material comprising a vessel having a pulverulent material inlet opening at the upper side thereof, a gas-permeable deck adjacent the bottom of the vessel, a plenum chamber beneath said gas-permeable deck, means for introducing gas under pressure into said plenum chamber to pass upwardly through said gas-permeable deck into overlying pulverulent material to fluidize such material, said vessel having a discharge outlet opening, a baffle between the material inlet opening and the discharge outlet opening, said baffle defining, at least in part, a gas passage adjacent the upper wall of the vessel and a fluidized material passage adjacent said deck, and means for confining within said vessel gas passing through said gas-permeable deck for discharge through said vessel outlet, whereby upon introduction of gas into said plenum chamber it will pass through said gas-permeable deck and fluidize pulverulent material thereon, and said fluidized material will pass through said fluidized-material passage, and be expelled through said vessel discharge outlet by the confined gas passing through said discharge outlet.

2. Apparatus as set forth in claim 1 in which the baffle extends entirely across the vessel.

3. Apparatus as set forth in claim 1, having a conveying conduit connected to the vessel about the vessel discharge outlet, said conveying conduit having a generally-horizontally extending lower wall, and the portion of the conveying conduit adjacent the vessel decreases in cross-sectional area in a direction away from the vessel discharge outlet.

4. Apparatus as set forth in claim 1 having means for regulating the size of the fluidized-material passage independently of the rate of discharge of confined gas from the vessel.

5. Apparatus as set forth in claim 1 in which the upper edge of the baffle is spaced from the top of the vessel to provide the gas passage adjacent the top of the vessel.

6. Apparatus as set forth in claim 1 in which the upper edge of the baffle is spaced from the top of the vessel to provide a gas passage adjacent the top of the vessel, and which includes means for regulating the size of the fluidized-material passage independently of the rate of discharge of confined gas from the vessel.

7. Apparatus as set forth in claim 1 in which the vessel is of generally V-shape, and has a pulverulent material inlet opening adjacent the free ends of the sections forming the V, and the vessel discharge opening is at the apex of the V.

8. Apparatus as set forth in claim 1 in which the gas permeable deck slopes downwardly towards said vessel discharge outlet.

9. Apparatus as set forth in claim 1 in which the gas-permeable deck is substantially horizontal.

10. Apparatus as set forth in claim 1 in which said baffle is located adjacent the wall of the vessel having the discharge outlet and is inclined upwardly and rearwardly.

11. Apparatus as set forth in claim 1 in which said baffle is located adjacent the wall of the vessel having the discharge outlet and extends in a substantially vertical direction.

12. Apparatus as set forth in claim 1 in which said baffle is located adjacent the wall of the vessel having the discharge outlet and is inclined upwardly and rearwardly and the upper edge of the baffle is spaced from the top of the vessel to provide the gas passage adjacent the top of the vessel, and which includes means for regulating the size of the fluidized-material passage independently of the rate of discharge of confined gas from the vessel.

13. Apparatus as set forth in claim 1 in which said baffle is located adjacent the wall of the vessel having the discharge outlet and extends in a substantially vertical direction and the upper edge of the baffle is spaced from the top of the vessel to provide the gas passage adjacent the top of the vessel, and which includes means for regulating the size of the fluidized-material passage independently of the rate of discharge of confined gas from the vessel.

14. Apparatus as set forth in claim 1 in which the means for introducing gas into the plenum chamber includes a conduit connected to the plenum chamber, a source of gas under pressure connected to said conduit, a branch conduit connected to said first-named conduit, a valve in said branch conduit for controlling the passage of gas therethrough, means responsive to a predetermined pressure in said first-named conduit for opening the valve in said branch conduit so that the gas from said source may be diverted through said branch conduit.

15. Apparatus as set forth in claim 14 including time-responsive means operable upon the elapse of a predetermined time to re-close the valve of said branch conduit.

16. Apparatus as set forth in claim 14 in which said branch conduit extends back to said source of gas under pressure.

17. Apparatus of the character described comprising a container for pulverulent material, said container having a discharge opening, a valve for controlling the flow of pulverulent material through said discharge opening, a vessel having a pulverulent material inlet opening at the upper side thereof connected to the discharge opening of the container, a gas-permeable deck adjacent the bottom of the vessel, a plenum chamber beneath said gas-permeable deck, a conduit for introducing gas under pressure into said plenum chamber to pass upwardly through said gas-permeable deck into overlying pulverulent material to fluidize said material, a source of gas under pressure connected to said conduit, a branch conduit connected to said first-named conduit, a valve in said branch conduit for controlling the flow of gas therethrough, means responsive to a predetermined pressure in said first-named conduit for opening the valve in said branch conduit so that gas from said source may be diverted through said branch conduit, time-responsive means operable upon the elapse of a predetermined time to re-close the valve in said branch conduit, means for delaying the closing of the valve in said branch conduit, means for opening and closing the valve for the discharge opening of the container, and means operable upon a closing of the valve for the discharge opening of the container to overcome said delaying means, whereby the valve in said branch conduit is maintained open for the diversion of gas from said plenum chamber until the valve for the discharge opening of the container is closed, said vessel having a discharge outlet opening at one side thereof, whereby upon introduction of gas into said plenum chamber it will pass through said gas-permeable deck and fluidized pulverulent material thereon, and said fluidized material will flow through said vessel discharge outlet.

18. Apparatus as set forth in claim 17 in which a baffle extends across the vessel between the material inlet opening and the discharge outlet opening of the vessel, said baffle defines at least in part a gas passage adjacent the upper wall of the vessel and a fluidized-material passage adjacent said deck, and means for confining within said vessel gas passing through said gas-permeable deck for discharge through said vessel outlet, whereby upon introduction of gas into said plenum chamber the fluidized material will pass through said fluidized-material passage and be expelled through the vessel discharge outlet by the confined gas passing through said vessel discharge outlet.

19. Apparatus as set forth in claim 18 having means for regulating the size of the fluidized-material passage independently of the rate of discharge of the confining gas from the vessel.

20. Apparatus as set forth in claim 18 in which the upper edge of the baffle is spaced from the top of the vessel to provide the gas passage adjacent the top of the vessel.

21. Apparatus as set forth in claim 18 in which the vessel is of generally V-shape and has a pulverulent inlet opening adjacent the free ends of the section forming the V, and the vessel discharge outlet is at the apex of the V.

22. Apparatus as set forth in claim 18 in which said baffle is located adjacent the wall of the vessel having the vessel discharge outlet, and is inclined upwardly and rearwardly.

23. Apparatus for discharging pulverulent material comprising a vessel having a pulverulent material inlet opening at the upper side thereof, a gas-permeable deck adjacent the bottom of the vessel, a plenum chamber beneath said gas-permeable deck, means for introducing gas under pressure into said plenum chamber to pass upwardly through said gas-permeable deck into overlying pulverulent material to fluidize such material and place it in a condition to flow along the upper surface of said deck, a barrier for holding back the main body of pulverulent material in said vessel, said barrier forming, at least in part, a passage adjacent said deck for permitting a relatively thin layer of fluidized pulverulent material to flow along the gas-permeable deck below and beyond said barrier, said vessel having a compartment, at the side of the barrier remote from the material inlet opening, along the bottom of which the relatively thin layer of pulverulent material passing through said passage flows, said compartment having a discharge outlet at the bottom portion thereof, a free passageway for the flow of air from the upper portion of the material-receiving portion of said vessel to the upper portion of said compartment, whereby a substantially balanced pressure is maintained in said material-receiving portion of the vessel and in said compartment, and means for confining within said material-receiving portion of said vessel and said compartment gas passing through said gas-permeable deck for discharge through said discharge outlet, whereby upon introduction of gas into said plenum chamber it will pass through said gas-permeable deck and fluidize pulverulent material thereon and then pass through said free passageway into said compartment, then downwardly in said compartment to impinge upon the relatively thin layer of fluidized pulverulent material at the bottom of said compartment to entrain said material and discharge it through said discharge outlet.

24. Apparatus as set forth in claim 23 in which the discharge outlet in said compartment is at the side thereof opposite said barrier means and in alignment with the direction of the flow of material passing said baffle.

25. Apparatus as set forth in claim 23 in which the gas-permeable deck and plenum chamber extends beneath said barrier means and said compartment.

26. Apparatus as set forth in claim 23, having means for regulating the size of the fluidized-material passageway independently of the rate of discharge of confined gas from the vessel.

27. Apparatus as set forth in claim 23 in which the gas-permeable deck slopes downwardly towards said vessel discharge outlet.

28. Apparatus of the character described comprising a container for pulverulent material, fluidizing means within said container for fluidizing pulverulent material therein, a vessel having an inlet communicating with said container to receive material fluidized in said container, valve means for controlling the flow of fluidized material into said vessel, means within said vessel for fluidizing pulverulent material therein, a conduit connected to the fluidizing means in said vessel, a source of gas under pressure connected to said conduit, a branch conduit connected to said first-named conduit, a valve in said branch conduit for controlling the flow of gas therethrough, means responsive to a predetermined pressure in said first-named conduit for opening the valve in said branch conduit so that gas from said source may be diverted through said branch conduit, time-responsive means operable upon the elapse of a predetermined time to re-close the valve in said branch conduit, means for delaying the closing of the valve in said branch conduit, means for opening and closing the valve means for the flow of material into the vessel, and means operable upon a closing of the valve means to overcome said delaying means, whereby the valve in said branch conduit is maintained open for the diversion of gas from the fluidizing means within the vessel until the valve means for the flow of material into the vessel is closed, said vessel having a discharge outlet at one side thereof, whereby material fluidized in said vessel will flow through said discharge outlet.

29. Apparatus of the character described comprising at least one container for pulverulent material, a gas-permeable deck in the lower portion of said container having a discharge portion, a plenum chamber beneath said gas-permeable deck from which gas may be introduced into pulverulent material on said deck to fluidize it, a vessel having an inlet communicating with said container and positioned to receive pulverulent material passing from said discharge portion of said gas-permeable deck, a valve for controlling the flow of fluidized material from said container into said vessel, a gas-permeable deck adjacent the bottom of said vessel, a plenum chamber beneath the gas-permeable deck in said vessel, means for introducing gas under pressure into said last-mentioned plenum chamber to pass upwardly through said gas-permeable deck into overlying pulverulent material to fluidize such material, said vessel having a discharge outlet opening in the lower region thereof, said discharge outlet forming the exit for material and gas from said vessel, and barrier means in said vessel and forming at least in part a passage for the flow of fluidized material towards said discharge outlet, said barrier means also forming at least in part a passageway for conducting gas passing upwardly through said pulverulent material and collecting in the upper portion of the vessel above material fluidized therein to a position within said vessel adjacent said discharge outlet and in open communication therewith for entrainment of pulverulent material adjacent said discharge outlet and discharge of said entrained material therethrough.

30. Apparatus for discharging pulverulent material comprising a vessel having a pulverulent material inlet opening, a gas-permeable deck adjacent the bottom of the vessel, a plenum chamber beneath said gas-permeable deck, means for introducing gas under pressure into said plenum chamber to pass upwardly through said gas-permeable deck into overlying pulverulent material to fluidize such material, a discharge passageway communicating with the space within said vessel and forming a discharge passage for material and gas from said vessel, partitioning means adjacent but spaced from the entrance to said discharge passageway, said partitioning means forming a barrier to the flow of fluidized material from the space back thereof to the entrance of said discharge passageway and forming at least in part a passage for the flow of fluidized material from the space back thereof towards said discharge passageway, and means for confining within said vessel gas passing through said gas-permeable deck for discharge through said discharge passageway, said partitioning means further forming at least in part a passageway for conducting gas separating from said fluidized material to a position between said partitioning means and said discharge passageway for entrainment of fluidized material passing through said fluidized material passage and for discharge of such entrained material through said discharge passageway.

31. Apparatus for discharging pulverulent material comprising a vessel having a pulverulent material inlet opening, a gas-permeable deck adjacent the bottom of the vessel, a plenum chamber beneath said gas-permeable deck, means for introducing gas under pressure into said plenum chamber to pass upwardly through said gas-permeable deck into overlying pulverulent material to fluidize such material, said vessel having a discharge outlet opening in the lower region thereof, said discharge outlet forming the exit for material and gas from said vessel, means for confining within said vessel gas passing through said gas-permeable deck for discharge through said discharge outlet, and partitioning means defining at least in part a compartment adjacent and communicating with said outlet, said partitioning means forming at least in part a material passage for the flow of fluidized material into said compartment, the partitioning means forming a barrier to the flow of fluidized material from the vessel through said compartment and discharge outlet except through said material passage, said partitioning means also forming at least in part a passageway for conducting to said compartment gas separating from said fluidized material, whereby the air introduced to the compartment impinges upon the upper surface of and entrains the fluidized material emerging from said material passage into said compartment for discharge through the discharge outlet.

References Cited in the file of this patent

UNITED STATES PATENTS

| | | |
|---|---|---|
| 1,736,969 | Greiser | Nov. 26, 1929 |
| 2,538,235 | Coffey | June 16, 1951 |
| 2,657,100 | Weller | Oct. 27, 1953 |
| 2,697,653 | Nicholson | Dec. 21, 1954 |

FOREIGN PATENTS

| | | |
|---|---|---|
| 751,162 | Great Britain | June 27, 1956 |